(12) United States Patent
Gemberling

(10) Patent No.: US 6,319,625 B1
(45) Date of Patent: Nov. 20, 2001

(54) GRAPHITE PLATE ASSEMBLY AND METHOD OF MANUFACTURE

(76) Inventor: George J. Gemberling, 15 River Ridge Dr., Sleepy Hollow, IL (US) 60118

(*) Notice: Subject to any disclaimer, the term of this patent is extended or adjusted under 35 U.S.C. 154(b) by 0 days.

(21) Appl. No.: 09/431,290

(22) Filed: Oct. 29, 1999

(51) Int. Cl.[7] ................................................. H01M 2/00
(52) U.S. Cl. ................................... 429/34; 429/35; 429/36
(58) Field of Search ................................ 429/34, 35, 38, 429/36, 37

(56) References Cited

U.S. PATENT DOCUMENTS

| | | | |
|---|---|---|---|
| 4,045,325 | * | 8/1977 | Schwickart et al. ................ 204/286 |
| 4,533,455 | * | 8/1985 | Balko et al. ....................... 204/279 |
| 5,300,370 | * | 4/1994 | Washington et al. ............... 429/34 |
| 5,482,680 | * | 1/1996 | Wilkinson et al. ................. 422/177 |

* cited by examiner

Primary Examiner—Stephen Kalafut
Assistant Examiner—Raymond Alejandro
(74) Attorney, Agent, or Firm—Douglas B. White

(57) ABSTRACT

There is provided herein a graphite plate assembly including an injection molded plastic frame which carries the border detail for the graphite plate. The planar graphite plate is provided with a frame engaging protrusion around its periphery and with beveled edges bordering the broad top and bottom surfaces of the graphite plate. These beveled edges seal against respective beveled surfaces of the mold to prevent plastic from entering onto the graphite plate surfaces during injection molding of the frame. The graphite plate is held in position within the mold by a vacuum grid and locating pins while plastic is injected into the cavity space around the graphite plate from a plurality of spaced plastic injection gates.

21 Claims, 4 Drawing Sheets

GRAPHITE PLATE ASSEMBLY AND METHOD OF MANUFACTURE

CROSS REFERENCE TO RELATED APPLICATIONS

Not Applicable

STATEMENT REGARDING FEDERALLY SPONSORED RESEARCH OR DEVELOPMENT

Not Applicable

BACKGROUND OF THE INVENTION

1. Field of the Invention

The present invention relates generally to graphite plates used in chemical reactive devices, such as electrodes in electrochemical fuel cells. More particularly this invention relates to a novel plastic framed graphite plate and the method of producing the frame and the plate assembly.

2. Description of the Prior Art

Fuel cells employing graphite plates for the electrochemical production of electricity from hydrogen are well known and typically include a stack of individual fuel cells electrically connected in series. Within a particular fuel cell, hydrogen contacts a graphite plate anode where it is converted to hydrogen ions and free electrons. These hydrogen ions migrate across an electrolyte to a graphite plate cathode where they react with oxygen and the free electrons.

The graphite plates used as electrodes in these fuel cells, and similar chemical reactive devices, have been constructed by a variety of methods in an attempt to produce an effective and economical device. One common method, described in U.S. Pat. No. 4,165,349, includes forming the graphite plate by molding the plate from a mixture of carbon fibers and thermosetting resin; and in this technique, mounting holes and gas ports are usually machined into the finished plate. Another method of production includes impregnating a paper substrate with carbon (U.S. Pat. No. 4,782,586) to produce a higher density and lower porosity at the border of the plate. This higher density in the border of the plate is designed to seal the fuel cell around the electrode, but the border detail must still be added to the fragile plate after impregnation. Similarly, in U.S. Pat. No. 4,269,642 a reinforced border for a graphite plate is accomplished by compressing an increased thickness around the perimeter of the plate; but as before, the border detail must still be machined into the fragile graphite plate.

Due to the difficulty in adding the requisite border detail, such as gas inlets, gas outlets and mounting holes, to the inherently weak borders of a graphite plate, all of these prior art graphite plates have been expensive to manufacture. Consequently, a need has developed for a method of including this border detail in the production of graphite plates without the cost, complexity, and lengthy production time typically associated with the manufacture of the graphite plates.

SUMMARY OF THE INVENTION

Accordingly, it is the principal objective of this invention to provide an improved graphite plate assembly which achieves a strong yet economical border for use in both sealing around the electrode when in use and for carrying the necessary border details required of the graphite plates.

It is a further objective of this invention to provide a functional plastic frame for a graphite plate which can be economically injection molded around a pre-formed graphite plate.

It is yet another objective of this invention to provide a method of molding a plastic frame for the graphite plate which preserves the integrity of the detail on the surface of the graphite plate.

The present invention accomplishes these and other objectives by providing an injection molded plastic frame for a graphite plate where the strong plastic frame carries all of the requisite border detail. In the preferred embodiment, an injection mold holds a preformed graphite plate within a mold during the plastic injection. Alternatively, a plastic frame may be pre-molded and the graphite plate formed within the frame.

In the preferred embodiment, the graphite plate is first constructed with frame engaging protrusions around its periphery and with beveled bordering edges near its critical surface detail. Locating holes are provided in the graphite plate to position the plate within the injection mold.

The mold cavity member and mold core member both present beveled edges positioned to engage the beveled edges of the graphite plate and to create a seal. These engaging edges then act as a "mold shut-off" to prevent injected plastic from flowing onto the surface of the graphite plate. Plastic is injected into the mold cavity area around the graphite plate from multiple gates to balance the pressure from the incoming plastic and thereby prevent movement and breakage of the fragile graphite plate. The injected plastic forms a surrounding frame for the graphite plate which engages the peripheral protrusions of the graphite plate and which includes all of the requisite border detail. When the plastic solidifies, the mold is opened to yield a graphite plate assembly with a tough plastic frame that is easier to handle and that now has the border detail inexpensively molded into the frame.

While the invention will be described in connection with a preferred embodiment, it will be understood that it is not the intent to limit the invention to that embodiment. On the contrary, it is the intent to cover all alternatives, modifications, and equivalents as may be included within the spirit and scope of the invention as defined by the appended claims.

DESCRIPTION OF THE PREFERRED EMBODIMENT

Figure 1:
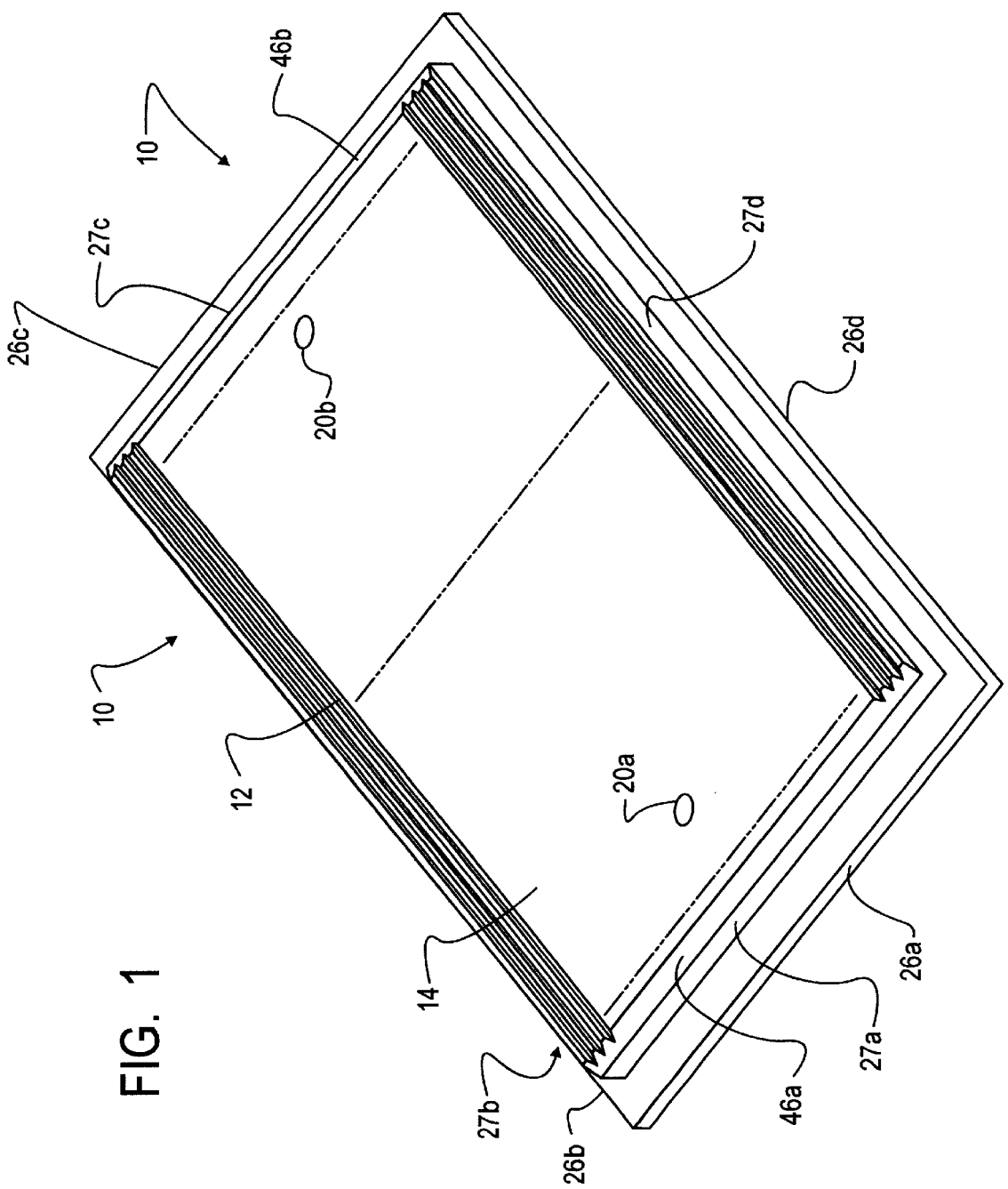
FIG. 1 is a perspective view of an embodiment of a graphite plate for use in the graphite plate assembly of the present invention.
Figure 3:
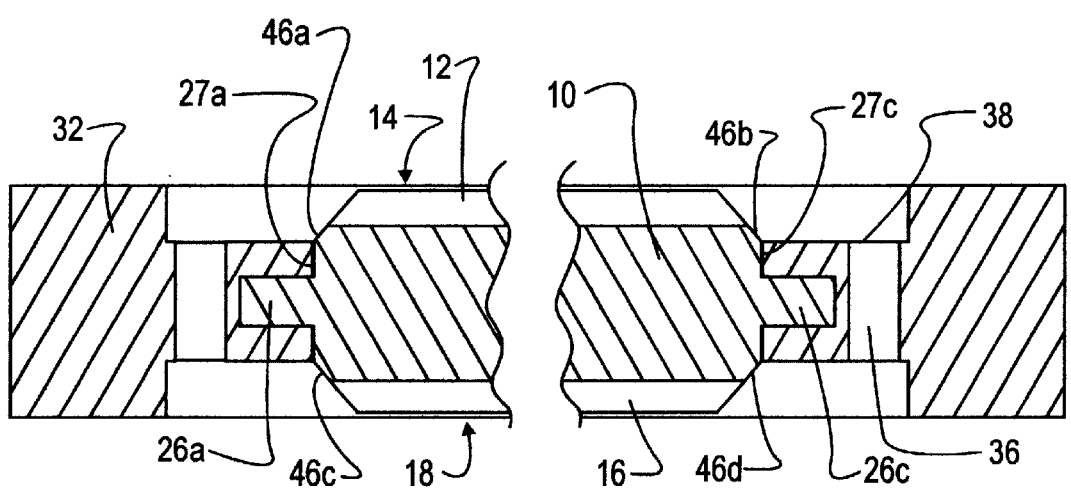
FIG. 3 is a cross sectional view of the assembly of FIG. 2 taken along the line 3—3.

Turning first to FIG. 1 there is shown a planar graphite plate member 10, formed according to methods commonly known to the art. This graphite plate member includes typical surface detail in the form of grooves 12, or the like, on its top surface 14 and surface detail in the form of grooves 16, or the like, on its bottom surface 18 (FIG. 3). (It is to be noted that the references herein to the top and bottom surfaces of the graphite plate member are for convenient relative positional reference only and do not represent a limitation on the graphite plate or the scope of this invention.) Within the graphite plate member are positioning means for holding the graphite plate member in position during the injection molding of the frame, as more fully described below. This positioning means may include indentations or holes 20a and 20b located in the graphite plate for engagement with locating pins (described below) within the injection mold.

The formed graphite plate member further includes frame engaging means, such as frame engaging protrusions 26a–26d (FIG. 1 and FIG. 3), located proximate the peripheral sides 27a–27d, that is, along substantially the entire periphery of the graphite plate member so as to extend outwardly from the graphite plate member to engage a surrounding frame. This frame engaging means may be of any suitable shape or size, including indentations in the graphite plate member; and while it is preferably located along substantially the entire periphery of the graphite plate member, it should be located on at least two opposing peripheral sides, such as the protrusions 26a and 26c.

Figure 2:
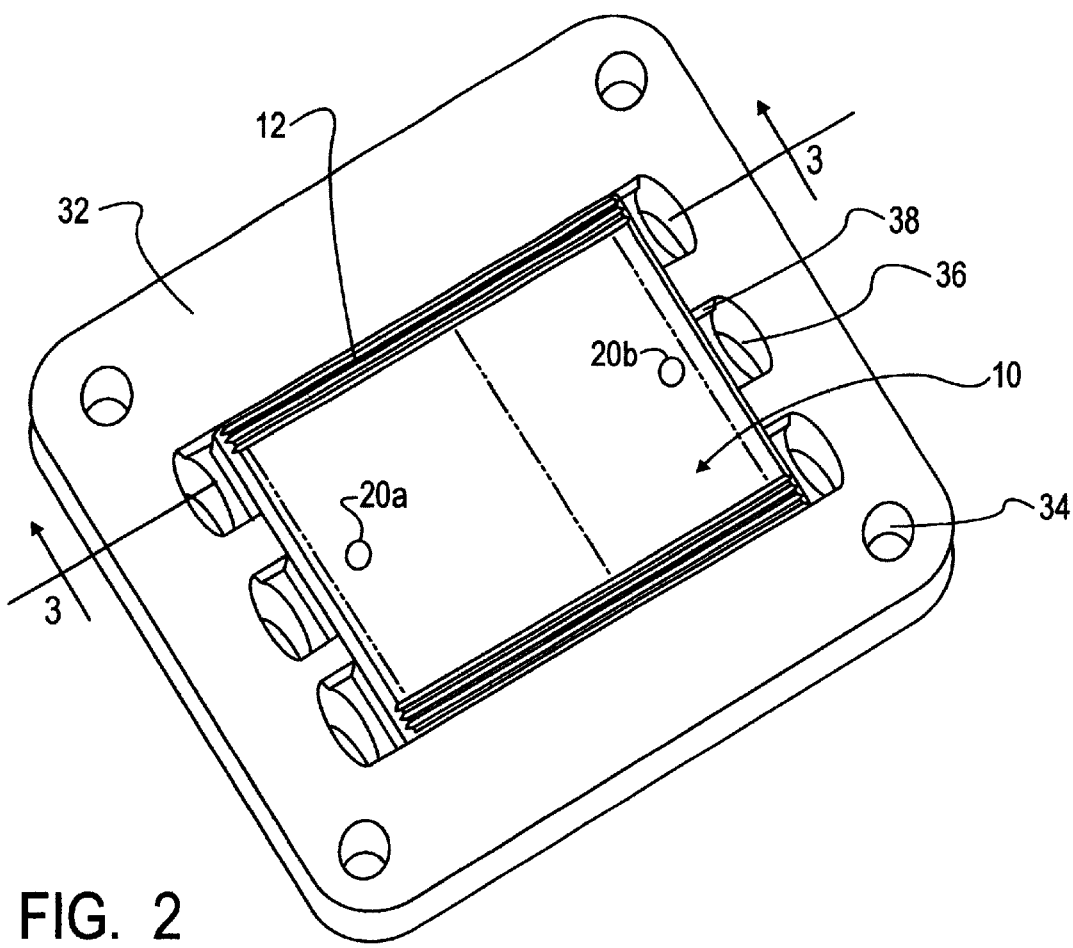
FIG. 2 is a perspective view of a graphite plate assembly including a plastic molded frame surrounding the graphite plate of FIG. 1, in accordance with the present invention.

As depicted in FIG. 2, the graphite plate assembly of the present invention comprises a graphite plate member 10 having grooves (or other surface detail) 12 on the top (and/or bottom) surface thereof and a frame 32 surrounding the periphery of the graphite plate member. This frame 32 can be constructed of any stiff and durable material, but is preferably molded, or otherwise formed, from either thermoplastic materials, thermosetting materials, or rubber materials. In the preferred embodiment, the frame 32 is injection molded from thermoplastic material around the formed graphite plate member. The frame consequently engages the frame engaging protrusions 26a–26d on the periphery of the plate to form a strong high density plastic border for the graphite plate. Within the frame are positioned typical mounting holes 34, gas ports 36, channels 38 and any other requisite detail for the mounting or operation of the graphite plate assembly. These border details are preferably molded into the frame during the injection molding process, but they may also be easily machined into the frame after molding due to the improved handling characteristics of this graphite plate assembly.

In the preferred embodiment, the graphite plate assembly is manufactured by first constructing the above described configuration of a graphite plate member by any of the means currently known to the art. Once so constructed, the graphite plate member is placed into an injection mold cavity 40, such as that shown in FIG. 4. Within this mold cavity, the graphite plate is held in place by positioning means, such as by locating pins 42a and 42b positioned to engage the respective locating holes 20a and 20b of the graphite plate member. Additionally, or alternatively, the graphite plate member can be held in place by a grid of vacuum holes 44, or by other equivalent means known to the art.

In order to prevent injected plastic from flowing onto the above-mentioned surface detail (12 and 16) of the graphite plate member during the injection molding of the frame, there is provided mold shut-off means, more fully described below, which includes, in part, defined bordering surfaces proximate the top and bottom surfaces of the graphite plate member. Particularly, bordering surfaces in the form of beveled edges 46a and 46b (FIGS. 1 and 3) are provided near the top surface 14 of the graphite plate member and similar beveled edges 46c and 46d are likewise provided near the bottom surface 18 of the graphite plate member. These bordering surfaces present a mold engaging surface configuration that separates the peripheral sides of the graphite plate member from its critical top and bottom surfaces. All edges surrounding the top and bottom surfaces can be beveled in this manner, if desired, but only those edges which are proximate critical surface detail, such as at the open ends of the grooves (edges 46a, 46b, 46c, and 46d) need to be beveled.

Figure 4:
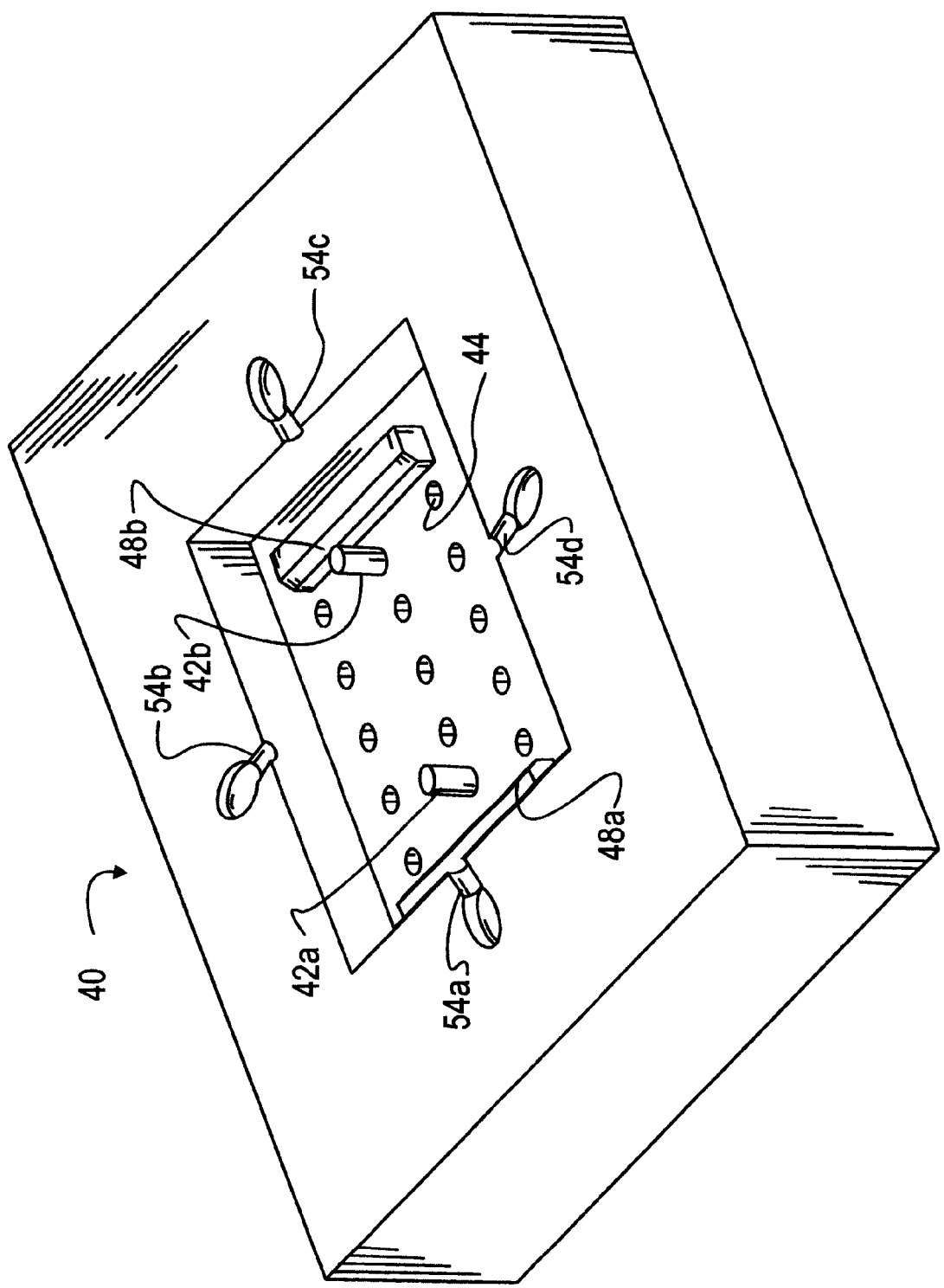
FIG. 4 is a perspective view of a mold cavity used in producing the injection molded plastic frame for the plate assembly of FIG. 2.
Figure 5:
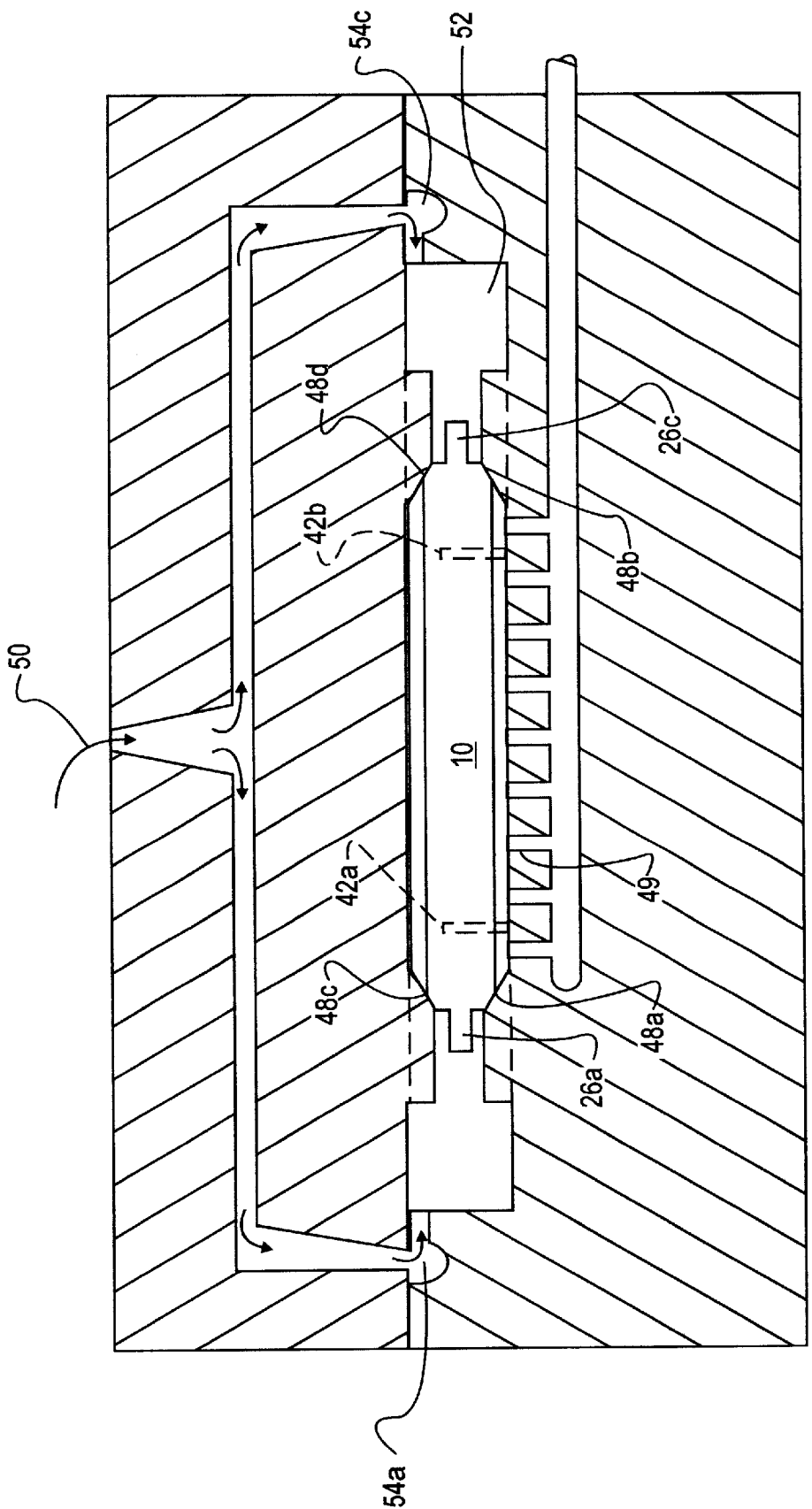
FIG. 5 is a cross sectional view of an injection mold for producing the injection molded plastic frame for the plate assembly of FIG. 2.

The mold shut-off means further includes shut-off surfaces in the mold cavity 40, such as the beveled surfaces 48a and 48b (FIG. 4 and FIG. 5). These shut-off surfaces are positioned within the mold cavity to contact the respective beveled bordering surfaces 46c and 46d near the bottom surface of the graphite plate member and to create a seal therebetween. Similar beveled shut-off surfaces 48c and 48d on the mold core serve to contact the respective beveled bordering surfaces 46a and 46b near the top surface of the graphite plate member. (While the preferred embodiment of these contacting bordering surfaces and shut-off surfaces between the graphite plate and the mold, respectively, are described herein as being beveled, it is to be understood that any corresponding surfaces, or surface configurations, which mate together or otherwise engage in a sealing fashion are within the scope of this invention.)

During the plastic injection step, molten plastic 50 (FIG. 5) is caused to flow into the mold under high pressure and enters the defined cavity area 52 between the mold core and the mold cavity, surrounding the graphite plate member. In the preferred embodiment, the molten plastic is injected through a plurality of spaced plastic injection gates 54a, 54b, 54c, and 54d (FIG. 4 and FIG. 5). By utilizing multiple gates spaced around the periphery of the graphite plate member it has been found that the pressure from the in-flowing plastic on the graphite plate member can be balanced, reducing the physical stress and risk of damage to the graphite plate.

As the injected plastic fills the cavity area 52 it forms an injection molded plastic frame around the graphite plate member that engages the peripheral frame engaging protrusions projecting from the periphery of the graphite plate member. Once the cavity area is filled and the plastic has cooled sufficiently, the mold is opened by separation of the mold core and mold cavity, and the completed plastic framed graphite plate assembly, as shown in FIG. 1, is removed.

In an alternative embodiment, the plastic frame is first injection molded to the desired shape and configuration, including frame engaging means to engage the frame to the graphite plate member. The graphite plate member may then be formed within the pre-molded frame according to methods known in the art for the formation of the graphite plate member.

From the foregoing description, it will be apparent that modifications can be made to the assembly, apparatus and method described herein without departing from the teachings of the present invention. Particularly, but without limitation, equivalent variations in the frame engaging device, the mold shut-off surface configurations, and in the type of injection molds chosen for use, are considered to be within the scope of this invention. Accordingly, the scope of the invention is only to be limited as necessitated by the accompanying claims.

What is claimed is:

1. A graphite plate assembly comprising:
   a graphite plate member having top and bottom surfaces defined thereon and peripheral sides defined along the periphery thereof;

mold shut-off means on said top or bottom surfaces of said graphite plate member for preventing plastic injected into a mold from flowing onto said top or bottom surfaces, respectively;

frame engaging means positioned along said peripheral sides of said graphite plate member for holding said graphite plate member within a frame member; and a frame member surrounding said graphite plate member, said frame member being arranged to engage said frame engaging means.

2. The graphite plate assembly of claim 1 wherein said mold shut-off means comprises bordering surfaces defined on said graphite plate member top or bottom surfaces thereof, respectively, for engaging corresponding surfaces defined in a mold.

3. The graphite plate assembly of claim 2 wherein said bordering surfaces of said graphite plate member are beveled surfaces.

4. The graphite plate assembly of claim 1 wherein said frame engaging means comprises frame engaging protrusions positioned along at least two opposing peripheral sides of said graphite plate member.

5. The graphite plate assembly of claim 4 wherein said frame engaging protrusions project from said opposing peripheral sides of said graphite plate member, respectively.

6. The graphite plate assembly of claim 1 wherein said graphite plate member further comprises positioning means for positioning said graphite plate member within an injection mold.

7. The graphite plate assembly of claim 1 wherein said frame engaging means comprises a frame engaging protrusion positioned along the periphery of said graphite plate member.

8. The graphite plate assembly of claim 6 wherein said frame member carries the mounting holes for the graphite plate assembly.

9. The graphite plate assembly of claim 4 wherein said mold shut-off means comprises bordering surfaces defined on said graphite plate member top or bottom surfaces thereof, respectively, for engaging corresponding surfaces defined in a mold.

10. The graphite plate assembly of claim 9 wherein said bordering surfaces of said graphite plate member are beveled surfaces.

11. The graphite plate assembly of claim 7 wherein said mold shut-off means comprises bordering surfaces defined on said graphite plate member top or bottom surfaces thereof, respectively, for engaging corresponding surfaces defined in a mold.

12. The graphite plate assembly of claim 11 wherein said bordering surfaces of said graphite plate member are beveled surfaces.

13. A graphite plate assembly comprising:

a graphite plate member having top and bottom surfaces defined thereon and peripheral sides defined along the periphery thereof;

mold shut-off means on said top or bottom surfaces of said graphite plate member for preventing plastic injected into a mold from flowing onto said top or bottom surfaces, respectively;

positioning means in said graphite plate member for positioning said graphite plate member within an injection mold;

frame engaging means positioned along said peripheral sides of said graphite plate member for holding said graphite plate member within a frame member; and a frame member surrounding said graphite plate member, said frame member being arranged to engage said frame engaging means.

14. The graphite plate assembly of claim 13 wherein said mold shut-off means comprises bordering surfaces defined on said graphite plate member top or bottom surfaces thereof, respectively, for engaging corresponding surfaces defined in a mold.

15. The graphite plate assembly of claim 14 wherein said bordering surfaces of said graphite plate member are beveled surfaces.

16. A graphite plate assembly comprising:

a graphite plate member having top and bottom surfaces defined thereon and peripheral sides defined along the periphery thereof;

mold shut-off means on said top or bottom surfaces of said graphite plate member for preventing plastic injected into a mold from flowing onto said top or bottom surfaces, respectively; and a frame member surrounding said graphite plate member.

17. The graphite plate assembly of claim 16 wherein said mold shut-off means comprises bordering surfaces defined on said graphite plate member top or bottom surfaces thereof, respectively, for engaging corresponding surfaces defined in a mold.

18. The graphite plate assembly of claim 17 wherein said bordering surfaces of said graphite plate member are beveled surfaces.

19. The graphite plate assembly of claim 16 wherein said graphite plate member further comprises positioning means for positioning said graphite plate member within an injection mold.

20. The graphite plate assembly of claim 19 wherein said mold shut-off means comprises bordering surfaces defined on said graphite plate member top or bottom surfaces thereof, respectively, for engaging corresponding surfaces defined in a mold.

21. The graphite plate assembly of claim 20 wherein said bordering surfaces of said graphite plate member are beveled surfaces.

* * * * *